United States Patent
Ishibashi

(10) Patent No.: US 8,659,666 B2
(45) Date of Patent: Feb. 25, 2014

(54) ELECTRONIC APPARATUS

(75) Inventor: Tohru Ishibashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 262 days.

(21) Appl. No.: 13/184,876

(22) Filed: Jul. 18, 2011

(65) Prior Publication Data

US 2012/0050551 A1  Mar. 1, 2012

(30) Foreign Application Priority Data

Aug. 26, 2010 (JP) ................. 2010-189983

(51) Int. Cl.
*H04N 5/225* (2006.01)
*H04N 7/00* (2011.01)
*H04N 11/00* (2006.01)

(52) U.S. Cl.
USPC ........................ 348/207.1; 348/552

(58) Field of Classification Search
USPC ............ 348/333.04, 207.1, 207.11, 184, 552
See application file for complete search history.

(56) References Cited

U.S. PATENT DOCUMENTS

| | | | |
|---|---|---|---|
| 5,604,647 A * | 2/1997 | Jo ................................... | 360/69 |
| 8,077,243 B2 * | 12/2011 | Morita et al. ............ | 348/333.04 |
| 2001/0002946 A1 * | 6/2001 | Yamagata et al. .............. | 386/95 |
| 2011/0216166 A1 * | 9/2011 | Takahashi et al. .............. | 348/46 |
| 2012/0090004 A1 * | 4/2012 | Jeong ............................. | 725/39 |
| 2013/0057762 A1 * | 3/2013 | Yoshida et al. ............... | 348/552 |

FOREIGN PATENT DOCUMENTS

JP  2009-077347  4/2009

* cited by examiner

*Primary Examiner* — Tuan Ho
*Assistant Examiner* — Shahbaz Nazrul
(74) *Attorney, Agent, or Firm* — Cowan, Liebowitz & Latman, P.C.

(57) ABSTRACT

An electronic apparatus has a first sending unit that sends predetermined data to an external apparatus, the predetermined data is generated by mixing video data and first error data; a second sending unit that sends second error data to the external apparatus without mixing video data and the second error data; and a selecting unit that selects one of the first sending unit and the second sending unit based on a state of the external apparatus to cause the external apparatus to notify an error associated with the electronic apparatus.

14 Claims, 6 Drawing Sheets

FIG. 3

| ERROR TYPE | ERROR WARNING |
|---|---|
| ERROR 1 | A TEMPERATURE OF IMAGE SENSING ELEMENT IS HIGH |
| ERROR 2 | A TEMPERATURE OF RECORDING MEDIUM IS HIGH |
| ERROR 3 | A REMAINING CAPACITY OF BATTERY IS INSUFFICIENT |
| ERROR 4 | A REMAINING CAPACITY OF RECORDING MEDIUM IS INSUFFICIENT |

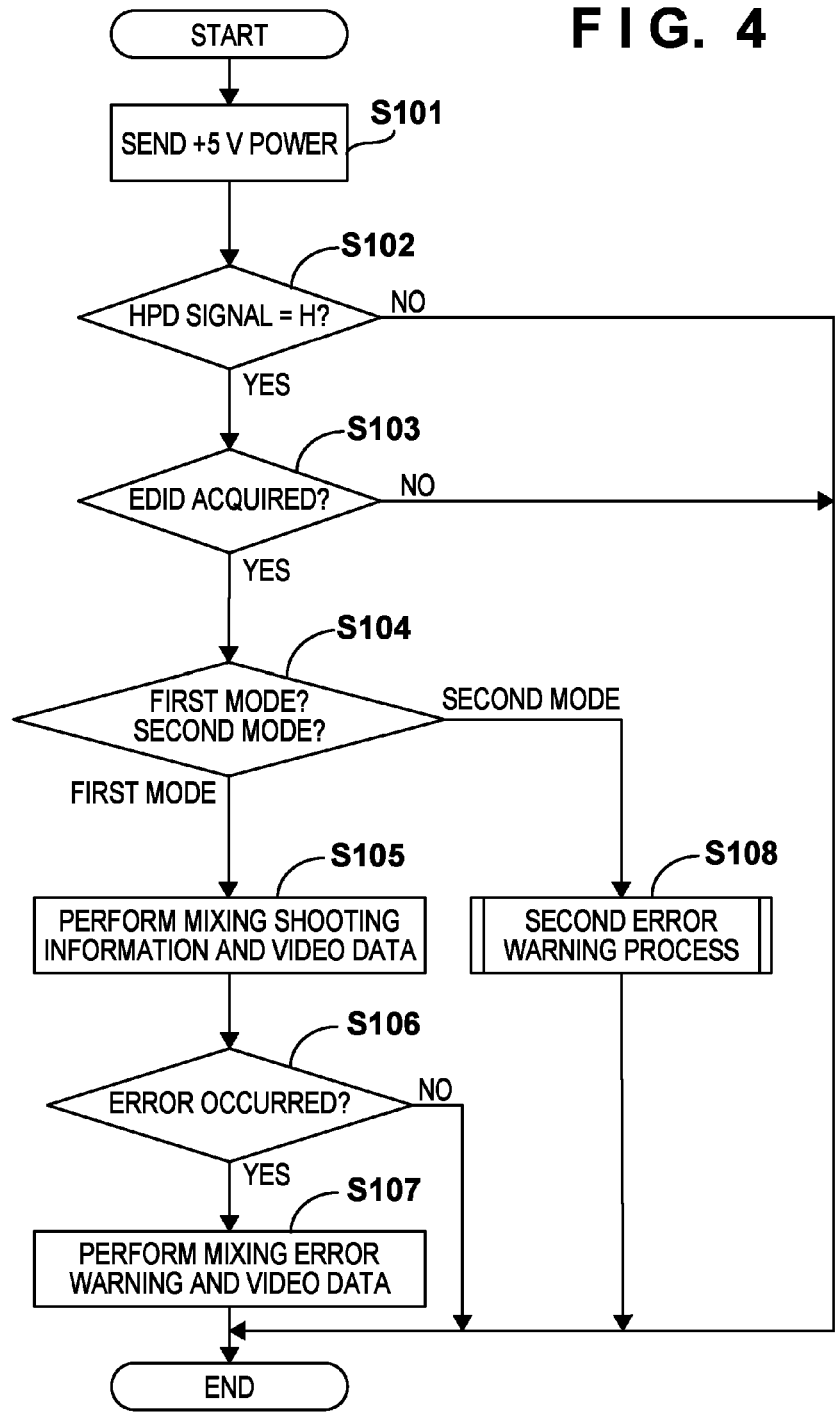

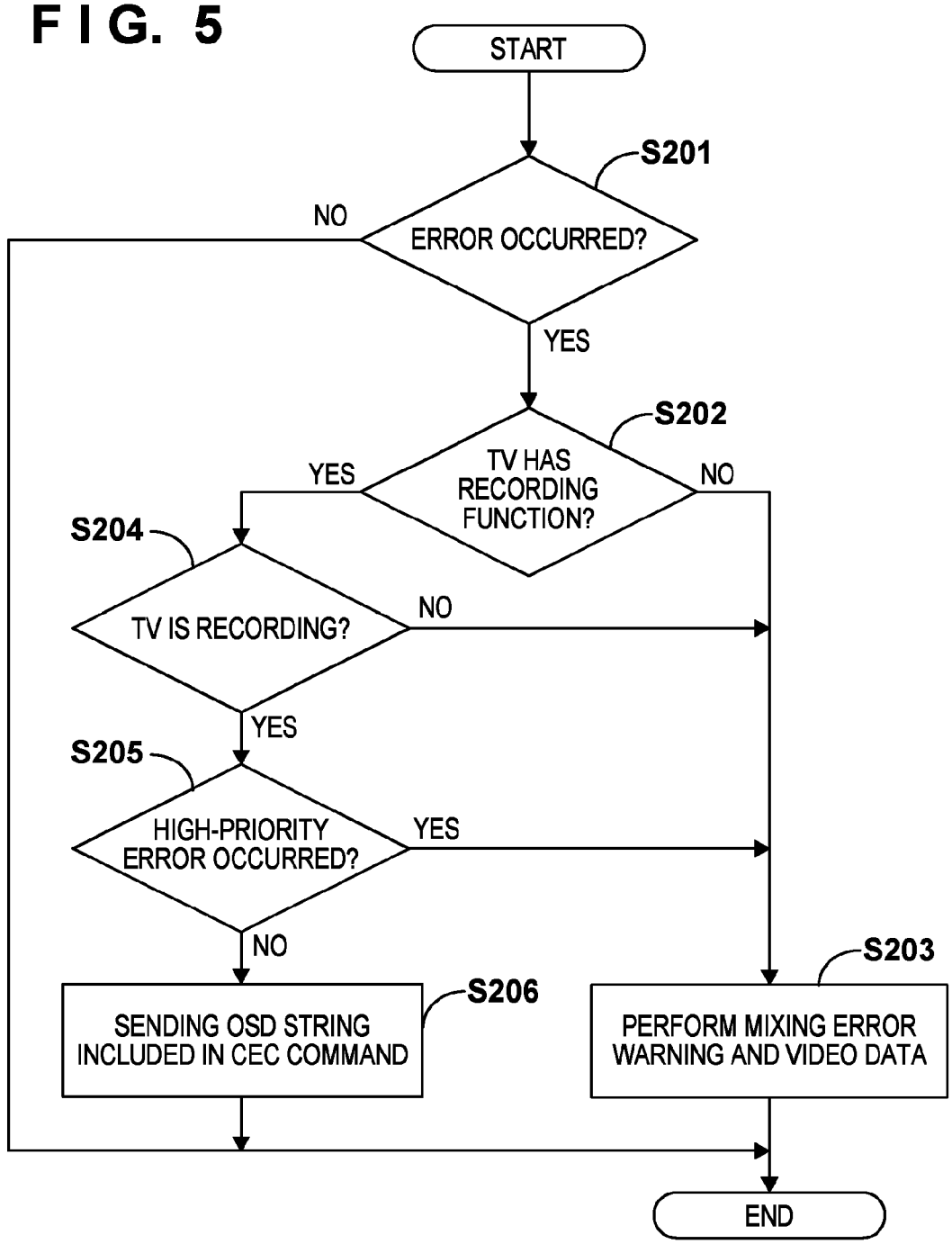

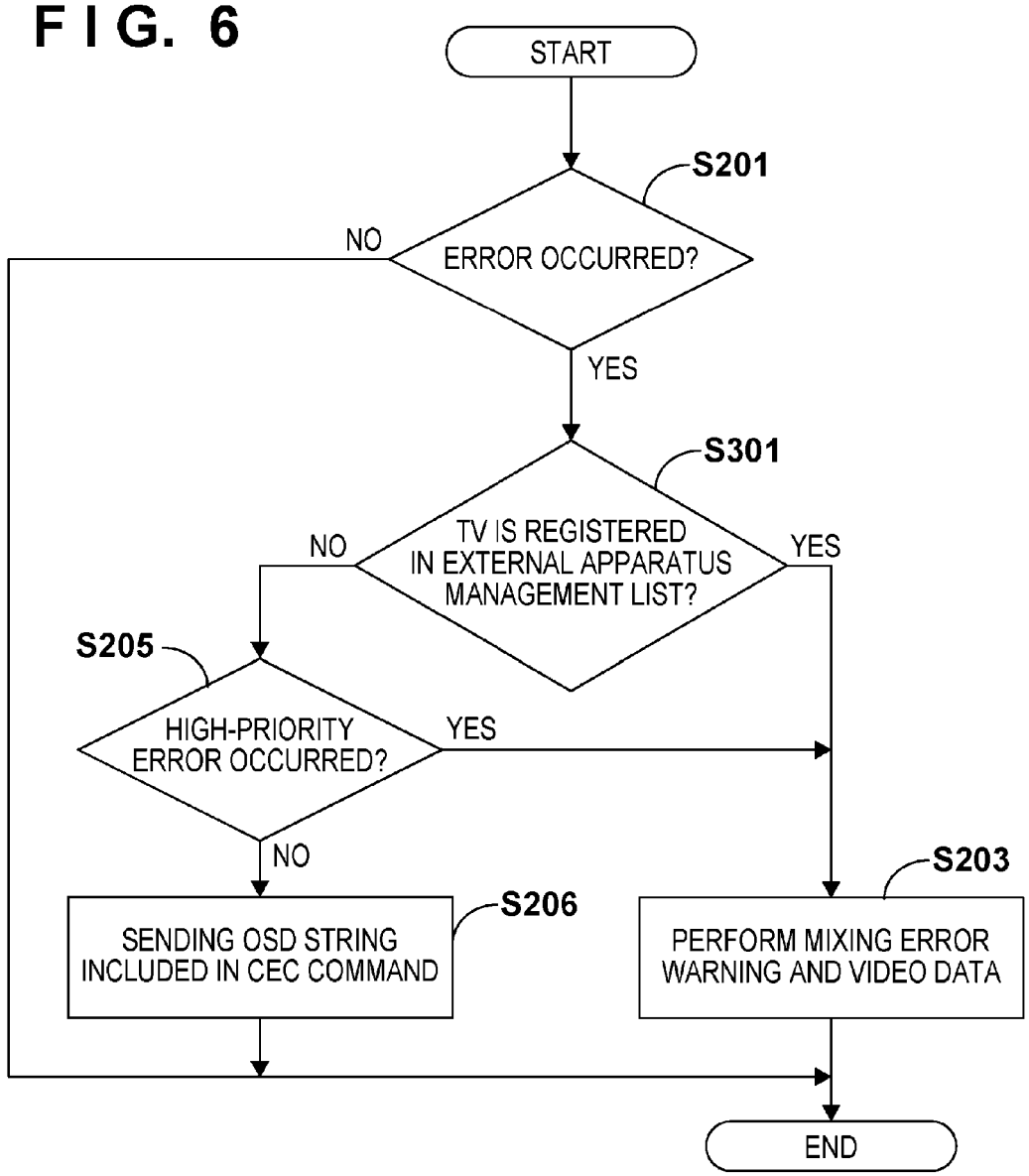

ELECTRONIC APPARATUS

BACKGROUND OF THE INVENTION

1. Field of the Invention

The present invention relates to an electronic apparatus that communicates with an external apparatus.

2. Description of the Related Art

Currently, a communication interface called HDMI (High-Definition Multimedia Interface) (registered trademark) has been proposed. A communication system compliant with HDMI standards (hereinafter, referred to as an "HDMI system") includes a source apparatus and a sink apparatus. The source apparatus can send video data via an HDMI interface. The sink apparatus can receive the video data from the source apparatus via the HDMI interface and display the received video data on a display.

Also, commands compliant with CEC (Consumer Electronics Control) standards (hereinafter, referred to as "CEC commands") can be used in an HDMI system. The source apparatus can control the sink apparatus with use of CEC commands. The sink apparatus can also control the source apparatus with use of CEC commands.

According to the disclosure of Japanese Patent Laid-Open No. 2009-077347, when a source apparatus performs authentication process for sending video data to a sink apparatus, if an error has occurred in authentication process performed on the sink apparatus, the source apparatus sends the sink apparatus a CEC command that includes character data indicating that an error has occurred. In this case, the character data indicating that an error occurred, which was received from the source apparatus, is displayed on a display by the sink apparatus, thus enabling allowing a user to recognize that an error occurred in the source apparatus.

However, the source apparatus has not been able to detect how the character data included in the CEC command will be displayed on the display by the sink apparatus, and it has not been possible to give the sink apparatus an instruction regarding character size and the position at which the character data is to be displayed.

Accordingly, there have been situations in which part of the character data included in a CEC command sent from a source apparatus to a sink apparatus is not displayed on the display of the sink apparatus.

For this reason, it has not been possible to use character data displayed on the display of the sink apparatus to allow the user to properly recognize that an error occurred in the source apparatus.

SUMMARY OF THE INVENTION

The present invention is directed to overcome the above-described drawbacks and disadvantages.

The present invention realizes technology that allows a user to properly recognize that an error occurred in a source apparatus.

According to an aspect of the present invention, there is provided an electronic apparatus comprising: a first sending unit that sends predetermined data to an external apparatus, wherein the predetermined data is generated by mixing video data and first error data; a second sending unit that sends second error data to the external apparatus without mixing video data and the second error data; and a selecting unit that selects one of the first sending unit and the second sending unit based on a state of the external apparatus to cause the external apparatus to notify an error associated with the electronic apparatus.

According to an aspect of the present invention, there is provided an electronic apparatus comprising: a first sending unit that sends predetermined data to an external apparatus, wherein the predetermined data is generated by mixing video data and first ancillary data; a second sending unit that sends second ancillary data to the external apparatus without mixing video data and the second ancillary data; and a selecting unit that selects one of the first sending unit and the second sending unit based on a state of the external apparatus to cause the external apparatus to output ancillary data associated with the electronic apparatus.

According to an aspect of the present invention, there is provided an electronic apparatus comprising: a sending unit that sends data to an external apparatus; and a control unit that controls the sending unit to execute one of a first process and a second process based on a state of the external apparatus to cause the external apparatus to notify an error associated with the electronic apparatus, wherein the first process includes a process for sending predetermined data to the external apparatus, the second process includes a process for sending second error data to the external apparatus without mixing video data and the second error data, and the predetermined data is generated by mixing video data and first error data.

According to an aspect of the present invention, there is provided an electronic apparatus comprising: a sending unit that sends data to an external apparatus; and a control unit that controls the sending unit to execute one of a first process and a second process based on a state of the external apparatus to cause the external apparatus to output ancillary data associated with the electronic apparatus, wherein the first process includes a process for sending predetermined data to the external apparatus, the second process includes a process for sending second ancillary data to the external apparatus without mixing video data and the second ancillary data, and the predetermined data is generated by mixing video data and first ancillary data.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the present invention and, together with the description, serve to explain the principles of the present invention.

FIG. 3 is a diagram showing an example of an error list according to first and second embodiments.

FIG. 4 is a flowchart showing an example of first error warning process according to first and second embodiments.

FIG. 5 is a flowchart showing an example of second error warning process according to First e.

FIG. 6 is a flowchart showing an example of second error warning process according to Second embodiment.

DESCRIPTION OF THE EMBODIMENTS

Various exemplary embodiments, features, and aspects of the present invention will now be described in detail below with reference to the attached drawings.

First Embodiment

Figure 1:
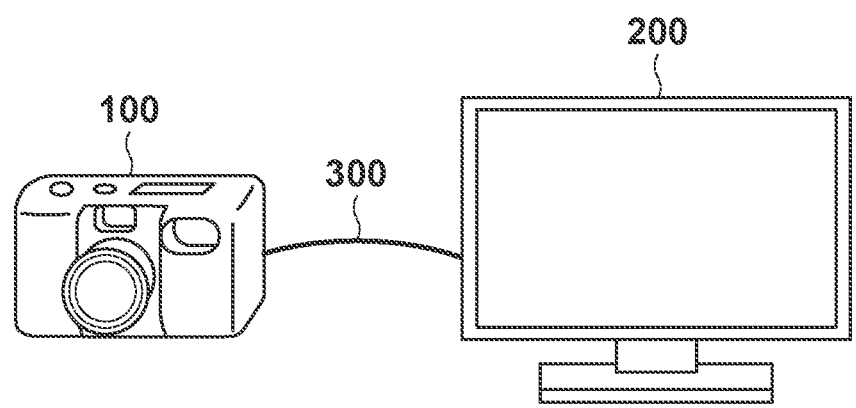
FIG. 1 is a diagram showing an example of a communication system according to first and second embodiments.

As shown in FIG. 1, a communication system according to First embodiment includes a communication apparatus 100 and an external apparatus 200 that are communicably connected via a connection cable 300.

The communication apparatus 100 is an image output apparatus that can send video data, audio data, and auxiliary data to the external apparatus 200 via the connection cable 300. The external apparatus 200 is a display apparatus that displays video data received from the communication apparatus 100 on a display and outputs audio data received from the communication apparatus 100 from a speaker. Various types of control commands can be sent bidirectionally between the communication apparatus 100 and the external apparatus 200 via the connection cable 300.

In First embodiment, it is assumed that the communication apparatus 100, the external apparatus 200, and the connection cable 300 are compliant with HDMI standards. Accordingly, the communication apparatus 100 is a source apparatus that functions as an HDMI source in HDMI standards, and the external apparatus 200 is a sink apparatus that functions as an HDMI sink in HDMI standards.

In First embodiment, it is assumed that the communication apparatus 100 and the external apparatus 200 are compliant with the CEC (Consumer Electronics Control) protocol defined in HDMI standards. The control commands sent bidirectionally between the communication apparatus 100 and the external apparatus 200 are compliant with the CEC protocol. Hereinafter, control commands compliant with the CEC protocol will be referred to as "CEC commands".

In First embodiment, a digital single-lens reflex camera (hereinafter, referred to as the "camera") is used as an example of the communication apparatus 100. Of course the communication apparatus 100 is not limited to being a digital single-lens reflex camera, and any electronic apparatus that outputs video data, such as a digital still camera, a digital video camera, a recorder, or a DVD player, may be used as the communication apparatus 100, as long as it is an apparatus that can function as an HDMI source apparatus.

In First embodiment, a television receiver (hereinafter, referred to as the "TV") is used as an example of the external apparatus 200. Of course the external apparatus 200 is not limited to being a TV, and any display apparatus, such as a projector or a personal computer, may be used as the external apparatus 200, as long as it is an apparatus that can function as an HDMI sink apparatus.

Hereinafter, the communication apparatus 100, the external apparatus 200, and the connection cable 300 will be referred to as the "camera 100", the "TV 200", and the "HDMI cable 300" respectively.

Figure 2:
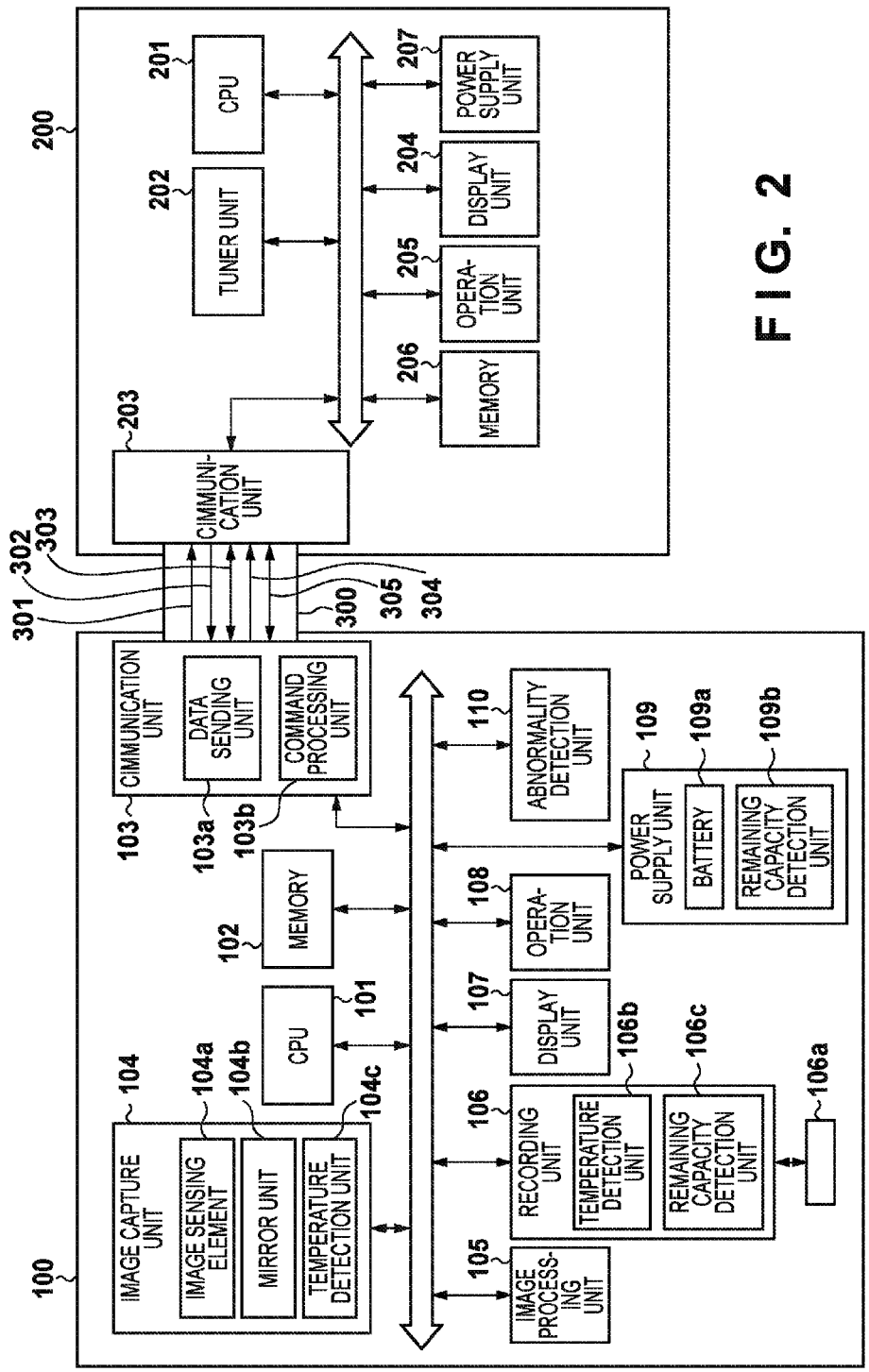
FIG. 2 is a block diagram showing an example of the communication system according to first and second embodiments.

Next is a description of the HDMI cable 300 with reference to FIG. 2.

The HDMI cable 300 has a +5V power line 301, an HPD (Hot Plug Detect) line 302, and a DDC (Display Data Channel) line 303. The HDMI cable 300 further has a TMDS (Transition Minimized Differential Signaling) line 304 and a CEC line 305.

The +5V power line 301 is a power supply line for supplying +5 V power from the camera 100 to the TV 200.

The HPD line 302 is a transmission line for the transmission of a high voltage level (hereinafter, referred to "H level") or low voltage level (hereinafter, referred to as "L level") HPD signal from the TV 200 to the camera 100.

The DDC line 303 is a transmission line for the transmission of device information of the TV 200, from the TV 200 to the camera 100.

The device information of the TV 200 is an EDID (Extended Display Identification Data) or an E-EDID (Enhanced EDID) of the TV 200. An EDID and an E-EDID both include, as device information of the TV 200, identification information of the TV 200, and information regarding the display capability, audio capability, and the like of the TV 200, for example. For example, an EDID and an E-EDID include information regarding the resolution, scan frequency, aspect ratio, color space, and so on that are supported by the TV 200. An E-EDID is an extension of an EDID and includes more device information than an EDID. For example, an E-EDID includes information regarding video data and audio data formats and the like that are supported by the TV 200. The identification information of the TV 200 is information indicating the product name of the TV 200, the manufacturer of the TV 200, the manufacturing year of the TV 200, and the like. Hereinafter, the EDID and the E-EDID are both referred to as an "EDID". Upon receiving the EDID of the TV 200, the camera 100 can automatically find out the display capability, audio capability, and the like of the TV 200 by referencing the EDID of the TV 200. Furthermore, a CPU 101 can automatically find out which video format and audio format are suited to the display capability and audio capability of the TV 200. Setting the settings of the camera 100 so as to be suited to the TV 200 enables the camera 100 to cause the video data and audio data sent from the camera 100 to the TV 200 to be video data and audio data that are suited to the capabilities of the TV 200.

The TMDS line 304 is a transmission line for the transmission of video data, audio data, and auxiliary data from the camera 100 to the TV 200. The TMDS line 304 includes a TMDS channel 0, a TMDS channel 1, a TMDS channel 2, and a TMDS clock channel.

The CEC line 305 is a transmission line for the bidirectional transmission of CEC commands between the camera 100 and the TV 200. The TV 200 can control the camera 100 by sending CEC command for controlling the camera 100 to the camera 100 via the CEC line 305.

Note that the HDMI cable 300 may be a cable compliant with the HDMI 1.3 standard or a cable compliant with a standard higher than HDMI 1.3.

Also, although the connection cable 300 has been described by way of example of the HDMI cable 300, the connection cable 300 may a communication interface that is compatible with HDMI standards, or a communication cable other than an HDMI cable.

Camera 100

Next is a description of an example of the configuration of the camera 100 with reference to FIG. 2.

As shown in FIG. 2, the camera 100 has the CPU 101, a memory 102, a communication unit 103, an image capture unit 104, an image processing unit 105, a recording unit 106, a display unit 107, an operation unit 108, a power supply unit 109, and an abnormality detection unit 110. The following describes the various units of the camera 100.

The CPU 101 performs overall control of operations of the camera 100 in accordance with a computer program stored in the memory 102. The CPU 101 can also perform overall control of operations of the camera 100 using the EDID of the TV 200. The CPU 101 performs overall control of the camera 100 by analyzing data supplied from the various units of the camera 100. The CPU 101 also performs control for causing the power supply unit 109 to supply power to the various units, and performs control for stopping the supply of power.

The memory 102 functions as a work area for the CPU 101. Examples of information stored in the memory 102 include the EDID of the TV 200 and analysis results obtained by the CPU 101 analyzing the EDID of the TV 200. The memory 102 also records the settings of flags with respect to operations of the various units, the results of calculation and analysis performed by the CPU 101, and the like. The memory 102 further records an error list such as that shown in FIG. 3. In the error list, error signals for identifying the types of errors and error warnings corresponding to the error types are recorded in association with each other. The error signals correspond to "Error 1", "Error 2", "Error 3", and "Error 4" in FIG. 3. The error warnings include, for example, the items "A temperature of an image sensing element is high", "A temperature of a recording medium is high", "A Remaining capacity of a battery is insufficient", and "A remaining capacity of a recording medium is insufficient" in FIG. 3. Although four error types and four error warnings are shown in FIG. 3, other error types and error warnings may be recorded in the error list. The memory 102 also records information indicating the product name of the camera 100, information indicating the product category of the camera 100, information indicating the manufacturer of the camera 100, and the like.

Note that the work area for the CPU 101 is not limited to being the memory 102, and it is possible to use, for example, an external recording apparatus such as a hard disk apparatus.

The communication unit 103 has a connection terminal for connection with the HDMI cable 300, and via the connection terminal, the communication unit 103 acquires the EDID of the TV 200, transmits and receives a CEC command, and sends video data, audio data, auxiliary data, and the like. The communication unit 103 has a data sending unit 103a and a command processing unit 103b.

The communication unit 103 is controlled by the CPU 101 so as to generate +5 V power from power supplied from the power supply unit 109, and send the generated +5 V power to the TV 200 via the +5V power line 301.

Also, the communication unit 103 can receive, via the HPD line 302, an HPD signal that has been sent from the TV 200. If the HPD signal received via the HPD line 302 has changed from an H level HPD signal to an L level HPD signal, the communication unit 103 notifies the CPU 101 that the HPD signal has changed from H level to L level. Also in the case where the HPD signal has changed from an L level HPD signal to an H level HPD signal, the communication unit 103 notifies the CPU 101 that the HPD signal has changed from L level to H level. If a request for the received HPD signal has been received from the CPU 101, the communication unit 103 supplies the HPD signal to the CPU 101.

The communication unit 103 can also acquire the EDID from the TV 200 via the DDC line 303. If the HPD signal is H level, the communication unit 103 can acquire the EDID of the TV 200 from the TV 200 via the DDC line 303. If the HPD signal is L level, the communication unit 103 cannot acquire the EDID from the TV 200 via the DDC line 303. If the EDID has been acquired, the communication unit 103 supplies the acquired EDID to the CPU 101, and the CPU 101 analyzes the supplied EDID and records the supplied EDID and the EDID analysis results in the memory 102.

The data sending unit 103a can send video data, audio data, and auxiliary data to the TV 200 via the TMDS line 304. If the operating mode of the camera 100 is a shooting mode, the communication unit 103 can send video data generated by the image capture unit 104 and audio data generated by a microphone unit (not shown) to the TV 200 via the TMDS line 304. In this case, auxiliary data generated by the CPU 101 is also sent to the TV 200 via the TMDS line 304 along with the video data and the audio data. If the operating mode of the camera 100 is a reproduction mode, the communication unit 103 can send video data and audio data that have been reproduced from the recording medium 106a by the recording unit 106, to the TV 200 via the TMDS line 304. In this case, auxiliary data generated by the CPU 101 is also sent to the TV 200 via the TMDS line 304 along with the video data and the audio data. Also, the data sending unit 103a may send the video data and the audio data separately.

The command processing unit 103b receives, via the CEC line 305, a CEC command that has been sent from the TV 200. The CEC command received from the TV 200 is supplied from the command processing unit 103b to the CPU 101. The CPU 101 controls the camera 100 in accordance with the CEC command received from the TV 200.

The command processing unit 103b also sends a CEC command for controlling the TV 200 to the TV 200 via the CEC line 305. The CEC command for controlling the TV 200 is generated by the CPU 101 and supplied from the CPU 101 to the command processing unit 103b. Also, if the camera 100 has sent a CEC command to the TV 200, upon receiving the CEC command from the camera 100, the TV 200 sends a response signal for the CEC command to the camera 100. Accordingly, the command processing unit 103b can receive the response signal for the CEC command from the TV 200. Examples of the response signal for the CEC command include an Ack signal indicating an affirmative response and a Nack response indicating a negative response.

If the operating mode of the camera 100 is the shooting mode, the image capture unit 104 captures images of a subject and generates video data from optical images of the subject. The video data generated by the image capture unit 104 may be moving image data or still image data. The video data generated by the image capture unit 104 is supplied from the image capture unit 104 to the data sending unit 103a, the recording unit 106, and the display unit 107. If a proper EDID has been received from the TV 200, the video data supplied from the image capture unit 104 to the data sending unit 103a is converted by the CPU 101 into video data suited to the display capability of the TV 200. The video data supplied from the image capture unit 104 to the data sending unit 103a is sent to the TV 200 via the TMDS line 304. The video data supplied from the image capture unit 104 to the recording unit 106 is recorded on the recording medium 106a. The video data supplied from the image capture unit 104 to the display unit 107 is displayed by the display unit 107.

The image capture unit 104 has a connection terminal capable of connection with a lens unit (not shown). The lens unit includes, for example, image sensing lenses such as a variator lens and a focusing lens, an aperture, and drive circuits for these. The image capture unit 104 also includes, for example, a focal plane-type shutter, an image sensing element 104a, a mirror unit 104b, an A/D conversion unit, a timing generation circuit, a viewfinder, and a temperature detection unit 104c.

The image sensing element 104a converts an optical image of a subject, which has been incident thereon via the lens unit (not shown) connected to the connection terminal of the image capture unit 104, into an image signal that is an electrical signal. Examples of the image sensing element include a CCD image sensor and a CMOS sensor. The mirror unit 104b moves to a position at which the optical image of the subject that was incident via the lens unit is guided to the image sensing element 104a, and to a position at which the optical image of the subject that was incident via the lens unit is guided to the viewfinder. The position at which the optical image of the subject is guided to the image sensing element 104a is a position at which the mirror unit 104b has retracted out of the path of the optical image of the subject. The position at which the optical image of the subject is guided to the viewfinder is a position at which the mirror unit 104b reflects the optical image of the subject toward the viewfinder in order to guide the optical image of the subject to the viewfinder.

The A/D conversion unit converts the image signal (analog data) output from the image sensing element 104a into digital data (video data), and supplies the digital data to the memory 102, the communication unit 103, the image processing unit 105, the recording unit 106, and the display unit 107. The timing generation circuit supplies a clock signal and a control signal to the various units of the image capture unit 104. Also, if the operating mode of the camera 100 is the shooting mode, the image capture unit 104 captures images of a subject and generates video data from optical images of the subject. If the operating mode of the camera 100 is the reproduction mode, the image capture unit 104 stops subject image capturing, and stops the generation of video data from optical images of the subject. Note that the video data generated by the image capture unit 104 may be still image data or moving image data.

If the temperature of the image sensing element 104a becomes high, noise appears in the image signal (analog data) generated by the image sensing element 104a, and the video data generated by the image capture unit 104 degrades. In order to prevent such a situation, the temperature detection unit 104c detects the temperature of the image sensing element 104a in order to prevent degradation of the image signal (analog data) generated by the image sensing element 104a. The temperature detection unit 104c also outputs first temperature information indicating the temperature of the image sensing element 104a to the abnormality detection unit 110.

The image processing unit 105 performs image processing such as pixel interpolation processing and color conversion processing on video data output from the image capture unit 104 and video data read out from the memory 102 and the recording medium 106a. The image processing unit 105 includes a compression/decompression circuit that uses a known compression method to compresses video data using adaptive discrete cosine transform (ADCT), and decompresses compressed video data. Note that examples of compression systems for compressing video data include the JPEG system, the MPEG system, and the RAW system. Video data that has been read out from the memory 102 is subjected to compression processing or decompression processing in the compression/decompression circuit, and the video data resulting from the compression processing or the decompression processing is output by the image processing unit 105 to the recording unit 106 or the communication unit 103.

The image processing unit 105 also generates video data suited to the image display capability of the TV 200 from video data that has been supplied from the image capture unit 104 or the recording unit 106 in accordance with the EDID of the TV 200 that is stored in the memory 102. In this case, the image processing unit 105 supplies the generated video data suited to the image display capability of the TV 200 to the communication unit 103 or the recording unit 106.

The image capture unit 104 and the image processing unit 105 are controlled by the CPU 101 so as to perform AF process and AE process. If an instruction for starting AF process and AE process has been received from the CPU 101, the image processing unit 105 performs arithmetic process using the video data output from the image capture unit 104. The image capture unit 104 and the image processing unit 105 perform TTL (Through-The-Lens) AF process and AE process based on the results of the arithmetic process.

The image capture unit 104 and the image processing unit 105 are also controlled by the CPU 101 so as to perform still image shooting. If an instruction for starting still image shooting has been received from the CPU 101, the image capture unit 104 and the image processing unit 105 execute shooting process, which includes process such as exposure process and development process. The analog data output from the image sensing element 104a is converted into digital data by the A/D conversion unit, and then written to the memory 102 as video data. The image capture unit 104 and the image processing unit 105 perform development process and compression process on the video data written to the memory 102. The video data resulting from the development process and the compression process is read out from the memory 102 and written to the recording medium 106a as still image data. Note that if the image capture unit 104 and the image processing unit 105 have performed AF process and AE process, shooting information such as information regarding the AF process and information recording the AE process is recorded in the memory 102. It should also be noted that the shooting information includes information indicating live-view settings, AF settings, the shutter speed, and the subject brightness.

If the operating mode of the camera 100 is the shooting mode, the video data generated by the image capture unit 104 and the audio data generated by the microphone unit are recorded on the recording medium 106a by the recording unit 106. The video data resulting from the image process performed by the image processing unit 105 is also recorded on the recording medium 106a by the recording unit 106. The recording of the video data and audio data generated by the image capture unit 104 and the microphone unit on the recording medium 106a is controlled by the CPU 101 in accordance with a user instruction that was input via the operation unit 108. Similarly, the recording of the video data resulting from the image process performed by the image processing unit 105 on the recording medium 106a is controlled by the CPU 101 in accordance with a user instruction that was input via the operation unit 108.

If the operating mode of the camera 100 is the shooting mode, the video data generated by the image capture unit 104 and the audio data generated by the microphone unit can be recorded on the recording medium 106a by the recording unit 106. The recording of the video data and audio data generated by the image capture unit 104 and the microphone unit on the recording medium 106a is controlled by the CPU 101 in accordance with a user instruction that was input via the operation unit 108.

If the operating mode of the camera 100 is the reproduction mode, the recording unit 106 can reproduce video data and audio data selected by the user from the recording medium 106a. The selection of video data and audio data to be reproduced from the recording medium 106a is controlled by the CPU 101 in accordance with a user instruction that was input via the operation unit 108.

The video data reproduced from the recording medium 106a by the recording unit 106 is supplied from the recording unit 106 to the data sending unit 103a and the display unit 107. If a proper EDID has been received from the TV 200, the video data supplied from the recording unit 106 to the data sending unit 103a is converted by the CPU 101 into video data suited to the display capability of the TV 200 in accordance with the EDID. The video data supplied from the recording unit 106 to the data sending unit 103a is sent to the TV 200 via the TMDS line 304. The video data supplied from the recording unit 106 to the display unit 107 is displayed by the display unit 107. The audio data reproduced from the recording medium 106a by the recording unit 106 is supplied from the recording unit 106 to the data sending unit 103a and a speaker unit (not shown). If a proper EDID has been received from the TV 200, the audio data supplied from the recording unit 106 to the data sending unit 103a is converted by the CPU 101 into audio data corresponding to the audio capability of the TV 200 in accordance with the EDID. The audio data supplied from the recording unit 106 to the data sending unit 103a is sent to the TV 200 via the TMDS line 304. The audio data supplied from the recording unit 106 to the speaker unit is output from the speaker unit.

The recording medium 106a is a recording medium such as a memory card or a hard disk apparatus. The recording medium 106a may be a recording medium included in the camera 100, or may be a recording medium that is detachable from the camera 100.

The recording unit 106 also has a temperature detection unit 106b that detects the temperature of the recording medium 106a in order to protect the recording medium 106a. The temperature detection unit 106b outputs second temperature information indicating the temperature of the recording medium 106a to the abnormality detection unit 110.

The recording unit 106 also has a remaining capacity detection unit 106c that detects the remaining capacity of the recording medium 106a. The remaining capacity detection unit 106c outputs remaining capacity information indicating the remaining capacity of the recording medium 106a to the abnormality detection unit 110. Note that the remaining capacity information may be a shooting number indicating the remaining number of still image data pieces that can be captured by the camera 100, or may be a recording time indicating the remaining recording time length of moving image data that can be captured by the camera 100.

The display unit 107 is configured by a display such as a liquid crystal display. If the operating mode of the camera 100 is the shooting mode, the display unit 107 displays video data generated by the image capture unit 104. If the operating mode of the camera 100 is the reproduction mode, the display unit 107 displays video data reproduced from the recording medium 106a by the recording unit 106.

The operation unit 108 provides a user interface for operating the camera 100. The operation unit 108 has, for example, a power button 108a, a mode change button 108b, a shutter button 108c, a cross-shaped button, and a menu button for operating the camera 100, and the various buttons are configured by switches, a touch panel, or the like. The CPU 101 can control the camera 100 in accordance with user instructions that have been input via the operation unit 108. If the user has operated buttons of the operation unit 108, operation signals corresponding to the buttons are input from the operation unit 108 to the CPU 101. The CPU 101 analyzes each operation signal input from the operation unit 108, and determines which process corresponds to the operation signal in accordance with the analysis results. The CPU 101 then controls the various units of the camera 100 so as to execute the process corresponding to the operation signal that was input from the operation unit 108.

The power button 108a is a button for instructing the CPU 101 to turn the power supply of the camera 100 either on or off.

The mode change button 108b is a button for instructing the CPU 101 to change the operating mode of the camera 100 to the shooting mode, the reproduction mode, or the like. The shooting mode is a mode in which still image data is generated by the image capture unit 104 and the image processing unit 105.

The shutter button 108c is a button for instructing the CPU 101 to control the camera 100 so as to shoot moving image data or still image data.

The menu button is a button for instructing the CPU 101 to display or cancel the display of menu screens for changing settings of the camera 100 that are stored in the memory 102. The user can set settings regarding live-view shooting in the camera 100 by operating these menu screens. The user can set a setting for performing live-view shooting by pressing the menu button to cause the display unit 107 to display a menu screen, and then selecting the live-view shooting item using the cross-shaped button.

Note that if the user has set the live-view shooting setting to "ON", a live-view shooting setting flag, which is stored in the memory 102 and indicates whether live-view shooting is to be performed, is set to "ON" by the CPU 101. Also, if the live-view shooting setting has been set to "OFF", the CPU 101 sets the live-view shooting setting flag in the memory 102 to "OFF".

The power supply unit 109 supplies power required by the various units of the camera 100 from an AC power supply or a battery 109a. The power supply unit 109 also determines whether the camera 100 is connected to the battery 109a, and determines whether the camera 100 is connected to the AC power supply. Also, the power supply unit 109 has a remaining capacity detection unit 109b that, if the battery 109a is connected to the camera 100, and furthermore the AC power supply is not connected to the camera 100, monitors the voltage of the battery 109a and detects the remaining capacity of the battery 109a. The remaining capacity detection unit 109b also outputs remaining capacity information indicating the remaining capacity of the battery 109a to the abnormality detection unit 110. Also, the remaining capacity detection unit 109b may detect the remaining capacity of the battery 109a from information indicating the remaining capacity of the battery 109a that has been acquired from the battery 109a. Note that the remaining capacity information may be information indicating the output voltage supplied by the battery 109a to the camera 100, or may be information indicating the charged capacity of the battery 109a. It should also be noted that the charged capacity of the battery 109a is a value indicating the remaining capacity of the battery 109a relative to the fully-charged state of the battery 109a.

Note that the battery 109a may be a primary battery such as an alkaline battery or a lithium battery, or a secondary battery such as a NiCd battery, a NiMH battery, a Li-ion battery, or a Li polymer battery. Also, the battery 109a is a battery that can be mounted in the camera 100.

The abnormality detection unit 110 acquires the first temperature information supplied from the temperature detection unit 104c, and periodically monitors the temperature of the image sensing element 104a. The abnormality detection unit 110 determines whether an error has occurred in the camera 100 by monitoring whether the temperature of the image sensing element 104a is greater than or equal to a predetermined temperature based on the first temperature information. If the abnormality detection unit 110 has determined that the temperature of the image sensing element 104a is greater than or equal to the predetermined temperature based on the first temperature information, the abnormality detection unit 110 supplies, to the CPU 101, a first error signal indicating that the temperature of the image sensing element 104a is high. Note that if the abnormality detection unit 110 has determined that the temperature of the image sensing element 104a is lower than the predetermined temperature based on the first temperature information, the abnormality detection unit 110 does not supply the first error signal to the CPU 101. If the temperature of the image sensing element 104a changes from being greater than or equal to the predetermined temperature, to being lower than the predetermined temperature, the abnormality detection unit 110 stops the supply of the first error signal to the CPU 101. Note that the predetermined temperature for comparison with the temperature of the image sensing element 104a by the abnormality detection unit 110 may be a value recorded in the memory 102 in advance, or may be a value calculated by the CPU 101 monitoring the temperature of the image sensing element 104a.

Also, if the recording medium 106a is connected to the camera 100, the abnormality detection unit 110 acquires the second temperature information supplied from the temperature detection unit 106b, and periodically monitors the temperature of the recording medium 106a. The abnormality detection unit 110 determines whether an error has occurred in the camera 100 by monitoring whether the temperature of the recording medium 106a is greater than or equal to a predetermined temperature based on the second temperature information. If the abnormality detection unit 110 has determined that the temperature of the recording medium 106a is greater than or equal to the predetermined temperature based on the second temperature information, the abnormality detection unit 110 supplies, to the CPU 101, a second error signal indicating that the temperature of the recording medium 106a is high. Note that if the abnormality detection unit 110 has determined that the temperature of the recording medium 106a is lower than the predetermined temperature based on the second temperature information, the abnormality detection unit 110 does not supply the second error signal to the CPU 101. If the temperature of the recording medium 106a changes from being greater than or equal to the predetermined temperature, to being lower than the predetermined temperature, the abnormality detection unit 110 stops the supply of the second error signal to the CPU 101. Note that the predetermined temperature for comparison with the temperature of the recording medium 106a by the abnormality detection unit 110 may be a value recorded in the memory 102 in advance, or may be a value calculated by the CPU 101 monitoring the temperature of the recording medium 106a.

Also, if the AC power supply (not shown) and the camera 100 are not connected, and furthermore the battery 109a and the camera 100 are connected, the abnormality detection unit 110 acquires the remaining capacity information supplied from the remaining capacity detection unit 109b, and periodically monitors the remaining capacity of the battery 109a. The abnormality detection unit 110 determines whether an error has occurred in the camera 100 by monitoring whether the remaining capacity of the battery 109a is greater than or equal to a predetermined value based on the remaining capacity information. If the abnormality detection unit 110 has determined that the remaining capacity of the battery 109a is less than the predetermined value based on the remaining capacity information, the abnormality detection unit 110 supplies, to the CPU 101, a third error signal indicating that the remaining capacity of the battery 109a is low. Note that if the abnormality detection unit 110 has determined that the remaining capacity of the battery 109a is greater than or equal to the predetermined value based on the remaining capacity of battery information, the abnormality detection unit 110 does not supply the third error signal to the CPU 101. In the case where the remaining capacity of the battery 109a is lower than the predetermined value, if the AC power supply and the camera 100 are connected, the power supply unit 109 supplies power from the AC power supply to the various units of the camera 100, and therefore the abnormality detection unit 110 stops the supply of the third error signal to the CPU 101. Note that the predetermined value for comparison with the remaining capacity of the battery 109a by the abnormality detection unit 110 may be a value recorded in the memory 102 in advance. Also, if the operating mode of the camera 100 is the shooting mode, the predetermined value for comparison with the remaining capacity of the battery 109a by the abnormality detection unit 110 may be determined by the CPU 101 in accordance with the power required by the camera 100 to perform shooting. For example, if the live-view shooting setting has been set to "ON", the CPU 101 may calculate the predetermined value for comparison with the remaining capacity of the battery 109a, based on the power required by the camera 100 to perform live-view shooting. As another example, if the live-view shooting setting has been set to "OFF", the CPU 101 may calculate the predetermined value for comparison with the remaining capacity of the battery 109a, based on the power required by the camera 100 to perform shooting other than live-view shooting. Furthermore, if the operating mode of the camera 100 is the reproduction mode, the predetermined value for comparison with the remaining capacity of the battery 109a by the abnormality detection unit 110 may be determined by the CPU 101 based on the power required by the display unit 107 to display video data recorded on the recording medium 106a.

Also, if the recording medium 106a is connected to the camera 100, the abnormality detection unit 110 acquires the remaining capacity information of the recording medium 106a supplied from the remaining capacity detection unit 106c, and periodically monitors the remaining capacity of the recording medium 106a. The abnormality detection unit 110 determines whether an error has occurred in the camera 100 by monitoring whether the remaining capacity of the recording medium 106a is greater than or equal to a predetermined value based on the remaining capacity information. If the abnormality detection unit 110 has determined that the remaining capacity of the recording medium 106a is less than the predetermined value based on the remaining capacity information, the abnormality detection unit 110 supplies, to the CPU 101, a fourth error signal indicating that the remaining capacity of the recording medium 106a is low. Note that if the abnormality detection unit 110 has determined that the remaining capacity of the recording medium 106a is greater than or equal to the predetermined value based on the remaining capacity information, the abnormality detection unit 110 does not supply the fourth error signal to the CPU 101. It should also be noted that the predetermined value for comparison with the remaining capacity of the recording medium 106a by the abnormality detection unit 110 may be a value recorded in the memory 102 in advance. Also, if the operating mode of the camera 100 is the shooting mode, the predetermined value for comparison with the remaining capacity of the recording medium 106a by the abnormality detection unit 110 may be calculated by the CPU 101 based on the shooting setting of the camera 100. For example, the CPU 101 may calculate the predetermined value for comparison with the remaining capacity of the recording medium 106a based on the recording size or pixel count of the video data to be captured by the camera 100.

Note that if the CPU 101 has received an error signal from the abnormality detection unit 110, the CPU 101 determines which kind of error is indicated by the received error signal, and selects an error warning in accordance with the received error signal. The CPU 101 furthermore outputs the selected error warning to the image processing unit 105, and the image processing unit 105 generates character information indicating the error warning selected by the CPU 101. Note that the character information generated by the image processing unit 105 that indicates the error warning selected by the CPU 101 is image data that can be checked visually.

Also, if an error signal has been received from the abnormality detection unit 110, the CPU 101 performs control so as to stop operations performed by units of the camera 100 in accordance with the received error signal. If the error signal received by the CPU 101 is the first error signal, the CPU 101 controls the image capture unit 104 so as to stop the operations performed by the image capture unit 104. If the error signal received by the CPU 101 is the second error signal, the CPU 101 controls the recording unit 106 and the recording medium 106a so as to stop the operations performed by the recording unit 106 and the recording medium 106a. If the error signal received by the CPU 101 is the third error signal, the CPU 101 controls the display unit 107 so as to display information indicating that the remaining capacity of the battery 109a is low, and then controls the power supply unit 109 so as to turn off the power of the camera 100. Also, besides information indicating that the remaining capacity of the battery 109a is low, the CPU 101 may control the display unit 107 so as to display information for prompting charging of the battery 109a. If the error signal received by the CPU 101 is the third error signal, the CPU 101 performs first warning processing and second warning processing that will be described later, and then turns off the power of the camera 100. Accordingly, in order to perform the first warning process and the second warning process, the CPU 101 prevents process other than the first warning process and the second warning process from being performed.

Examples of process other than the first warning process and the second warning process include process for receiving instructions that have been input via the operation unit 108, and overall control of the camera 100 in accordance with CEC command that have been received via the command processing unit 103b.

If the error signal received by the CPU 101 is the fourth error signal, the CPU 101 controls the display unit 107 so as to display information indicating that the remaining capacity of the recording medium 106a is low.

TV 200

Next is a description of an example of the configuration of the TV 200 with reference to FIG. 2.

As shown in FIG. 2, the TV 200 has a CPU 201, a tuner unit 202, a communication unit 203, a display unit 204, an operation unit 205, a memory 206, and a power supply unit 207.

The CPU 201 performs overall control of operations of the TV 200 in accordance with a computer program stored in the memory 206. The CPU 201 also performs control for causing the power supply unit 207 to supply power to the various units, and performs control for stopping the supply of power.

The tuner unit 202 receives a TV broadcast of the TV channel selected by the user. The TV channel can be selected using the operation unit 205 or a remote controller (not shown).

The communication unit 203 has a connection terminal for connection with the HDMI cable 300. The communication unit 203 can also receive video data, audio data, and auxiliary data that have been sent from the camera 100 via the TMDS line 304. Video data received from the camera 100 is displayed by the display unit 204. Audio data received from the camera 100 is output from the speaker unit (not shown). Auxiliary data received from the camera 100 is supplied to the CPU 201. The CPU 201 can control the TV 200 in accordance with the auxiliary data received from the camera 100.

Note that the number of connection terminals that the communication unit 203 has depends on the TV 200, and the TV 200 can be connected to source apparatuses other than the camera 100 via HDMI cables, with the maximum number of source apparatuses being equal to the number of connection terminals. For this reason, the TV 200 can receive video data, audio data, and auxiliary data that have been sent from source apparatuses other the camera 100 that are connected via HDMI cables. In this case, similarly to the camera 100, video data received from a source apparatus other than the camera 100 is displayed by the display unit 204, audio data received from that source apparatus is output from the speaker unit (not shown), and auxiliary data received from that source apparatus is supplied to the CPU 201.

The communication unit 203 can, via the CEC line 305, receive a CEC command that has been sent from the camera 100 and send a CEC command that has been generated by the CPU 201. Note that if a CEC command received from the camera 100 includes an "OSD String", the communication unit 203 supplies the "OSD String" to the CPU 201. An "OSD String" is character data represented by ASCII code as defined in HDMI standards. If a TV broadcast is being displayed by the display unit 204, the CPU 201 analyzes the "OSD String" and controls various units such that character data obtained from the analysis results and the video data received by the tuner unit 202 are displayed overlapped with each other by the display unit 204. The CPU 201 can also analyze the "OSD String" and control various units such that character data obtained from the analysis results and video data received from the camera 100 by the communication unit 203 are displayed overlapped with each other by the display unit 204. In the case where the display unit 204 is displaying video data received from another source apparatus by the communication unit 203, the CPU 201 controls various units such that character data obtained from the results of analyzing the "OSD String" and the video data from the other source apparatus are displayed overlapped with each other by the display unit 204.

The communication unit 203 determines whether the camera 100 is supplying +5 V power to the TV 200 via the +5V power line 301, and in accordance with the determination result, sends a HPD signal corresponding to H level or a HPD signal corresponding to L level to the camera 100 via the HPD line 302. If the communication unit 203 is not receiving +5 V power from the camera 100 via the +5V power line 301, the CPU 201 controls the communication unit 203 so as to send a HPD signal corresponding to L level to the camera 100 via the HPD line 302.

If the communication unit 203 is receiving +5 V power from the camera 100 via the +5V power line 301, the CPU 201 determines whether the EDID of the TV 200 stored in the memory 206 can be sent to the camera 100 via the DDC line 303. If the information included in the EDID stored in the memory 206 has not been changed, or if rewriting of the EDID has been completed, the CPU 201 determines that the EDID of the TV 200 can be sent to the camera 100 via the DDC line 303. In this case, the CPU 201 controls the communication unit 203 so as to send a HPD signal corresponding to H level to the camera 100 via the HPD line 302. If the information included in the EDID is being rewritten due to a setting of the TV 200 being changed, the CPU 201 determines that the EDID of the TV 200 cannot be sent to the camera 100 via the DDC line 303. In this case as well, the CPU 201 controls the communication unit 203 so as to send a HPD signal corresponding to L level to the camera 100 via the HPD line 302.

The communication unit 203 can also send the EDID of the TV 200 to the camera 100 via the DDC line 303.

The display unit 204 is configured by a display such as a liquid crystal display. The display unit 204 can display video data that has been supplied from at least either the tuner unit 202 or the communication unit 203. If video data received from the camera 100 has been supplied from the communication unit 203, the display unit 204 displays the video data received from the camera 100.

The operation unit 205 provides a user interface for operating the TV 200. The operation unit 205 has multiple buttons for operating the TV 200. The various buttons of the operation unit 205 are configured by switches, a touch panel, or the like. The CPU 201 can control the TV 200 in accordance with user instructions that have been input via the operation unit 205. The operation unit 205 has, for example, a power button, a channel selection button, and an external input button for operating the TV 200.

The power supply unit 207 supplies power required by the various units of the TV 200 from an AC power supply or the like.

First Error Warning Process

Next is a description of the first error warning process performed by the camera 100 of First embodiment with reference to FIG. 4.

FIG. 4 is a flowchart illustrating an example of the first error warning process performed by the camera 100 of First embodiment. If the power of the camera 100 is on, and furthermore the operating mode of the camera 100 is the shooting mode, the first error warning process is performed if the live-view setting is "ON". Note that it is assumed that the camera 100 and the TV 200 are connected via the HDMI cable 300.

It should also be noted that the first error warning process is controlled by the CPU 101 executing a computer program stored in the memory 102. The computer program for causing the camera 100 to execute the error warning process shown in FIG. 4 may be realized using, for example, a network or an OS (Operating System) running on a computer (a CPU, an MPU, or the like).

In step S101, the CPU 101 causes +5 V power to be generated from power supplied from the power supply unit 109, and controls the communication unit 103 so as to supply the +5 V power to the TV 200 via the +5V power line 301. After the communication unit 103 has supplied the +5 V power to the TV 200 via the +5V power line 301, the procedure of this flowchart advances from step S101 to step S102.

In step S102, the CPU 101 determines whether the HPD signal detected by the communication unit 103 is changed from L level to H level. If the CPU 101 has determined that the HPD signal detected by the communication unit 103 is changed from L level to H level (YES in step S102), the procedure of this flowchart advances from step S102 to step S103. If the CPU 101 has determined that the HPD signal detected by the communication unit 103 is not changed from L level to H level, that is to say, the HPD signal is L level (NO in step S102), the procedure of this flowchart ends.

In S103, the CPU 101 determines whether the communication unit 103 has acquired the EDID of the TV 200 via the DDC line 303. If the CPU 101 has determined that the communication unit 103 has acquired the EDID of the TV 200 via the DDC line 303 (YES in step S103), the procedure of this flowchart advances from step S103 to step S104. The communication unit 103 acquires the EDID of the TV 200 via the DDC line 303, and supplies the acquired EDID to the CPU 101. The CPU 101 analyzes the EDID of the TV 200 that was supplied from the communication unit 103, and after the EDID and the EDID analysis results have been recorded in the memory 102, the CPU 101 changes video data to a video format corresponding to the display capability of the TV 200, in accordance with the EDID analysis results. The CPU 101 supplies the video data that has been changed into a video format supported by the TV 200 to the data sending unit 103a, and the data sending unit 103a sends the video data to the TV 200 via the TMDS line 304. If the CPU 101 has determined that the communication unit 103 has not acquired the EDID of the TV 200 via the DDC line 303 (NO in step S103), the procedure of this flowchart ends.

In step S104, the CPU 101 determines whether the camera 100 is in a first mode or a second mode. If the CPU 101 has determined that the camera 100 is in the first mode, the procedure of this flowchart advances from step S104 to step S105. If the CPU 101 has determined that the camera 100 is in the second mode, the procedure of this flowchart advances from step S104 to step S108. The first mode is a mode used for sending data mixed video data and information related to the video data to the TV 200, and the second mode is a mode used for sending the video data to the TV 200 without sending data mixed video data and information related to the video data to the TV 200. Note that in the above description, in step S104, the CPU 101 determines whether the camera 100 is in the first mode or the second mode. However, in step S104, the CPU 101 may determine whether an instruction for mixing the video data and the information related to the video data has been received from the TV 200. In this case, if an instruction for mixing the video data and the information related to the video data has been received from the TV 200, the procedure of this flowchart advances from step S104 to step S105. However, if an instruction for mixing the video data and the information related to the video data has not been received from the TV 200, the procedure of this flowchart advances from step S104 to step S108.

In step S105, the CPU 101 controls the data sending unit 103a so as to send mixed data, which was obtained by mixing video data and shooting information recorded in the memory 102, to the TV 200. The mixed data obtained by mixing video data and shooting information recorded in the memory 102 is generated by the image processing unit 105. If shooting information recorded in the memory 102 has been supplied to the image processing unit 105, the image processing unit 105 converts the shooting information into character data. In accordance with the EDID of the TV 200, video data supplied from the image capture unit 104 and shooting character data obtained by converting shooting information into character data are mixed by the image processing unit 105, and thus the image processing unit 105 generates mixed data that is corresponding to the image display capability of the TV 200. The mixed data generated by the image processing unit 105 mixing the shooting character data and the video data is supplied to the communication unit 103, and the communication unit 103 sends the shooting mixed data to the TV 200 via the TMDS line 304.

If the data sending unit 103a has sent mixed data to the TV 200, the procedure of this flowchart advances from step S105 to step S106.

In step S106, the CPU 101 determines whether an error signal has been received from the abnormality detection unit 110. If the CPU 101 has determined that an error signal is received from the abnormality detection unit 110, the procedure of this flowchart advances from step S106 to step S107. If the CPU 101 has determined that an error signal is not received from the abnormality detection unit 110, the procedure of this flowchart ends. In this case, the process of step S105 to step S107 may be performed until the mode of the camera 100 has changed from the first mode to the second mode. Furthermore, if the mode of the camera 100 has changed from the first mode to the second mode, process may be performed similarly to the case where it has been determined in step S104 that the mode is the second mode.

In step S107, the CPU 101 controls the image processing unit 105 so as to generate error mixed data in which an error warning and video data are mixed. The CPU 101 determines which error type is indicated by the received error signal, and selects, from the memory 102, an error warning that indicates an error warning corresponding to the error type.

For example, if the first error signal has been received from the abnormality detection unit 110, the CPU 101 determines that the first error signal corresponds to "Error 1", and selects "A temperature of image sensing element temperature is high", which is the error warning corresponding to "Error 1".

Note that if the CPU 101 has received an error signal from the abnormality detection unit 110, the CPU 101 determines whether the received error signal corresponds to any of "Error 1", "Error 2", "Error 3", and "Error 4", and selects an error warning in accordance with the determination result. For example, if the first error signal has been received from the abnormality detection unit 110, the CPU 101 determines that the first error signal corresponds to "Error 1", and selects "A temperature of image sensing element temperature is high", which is the error warning corresponding to "Error 1". Also in the case where the CPU 101 has received the second error signal, the third error signal, or the fourth error signal from the abnormality detection unit 110, the CPU 101 determines whether the received error signal corresponds to any of "Error 1", "Error 2", "Error 3", and "Error 4". In this case as well, the CPU 101 selects an error warning in accordance with the determination result.

The CPU 101 supplies error warning information indicating the selected error warning to the image processing unit 105. If error warning information has been supplied to the image processing unit 105, the image processing unit 105 converts the error warning information into first warning data that is corresponding to the image display capability of the TV 200. Note that the first warning data is character information indicating error warning information, and is represented by katakana, hiragana, kanji, alphabet letters, or the like. In this case, the image processing unit 105 adjusts the size, color, and the like of the first warning data in accordance with the EDID of the TV 200. In accordance with the information included in the EDID of the TV 200, video data supplied from the image capture unit 104 and the first warning data are mixed by the image processing unit 105, and thus the image processing unit 105 generates mixed data that is corresponding to the image display capability of the TV 200. In this case, the image processing unit 105 adjusts the position at which the first warning data is mixed with the video data supplied from the image capture unit 104, in accordance with the information included in the EDID of the TV 200. Error mixed data, which is the mixed data obtained by the image processing unit 105 is mixed based on the first warning data and the video data, is supplied from the image processing unit 105 to the data sending unit 103a. The data sending unit 103a sends the error mixed data to the TV 200 via the TMDS line 304. The CPU 101 controls the data sending unit 103a so as to send the error mixed data to the TV 200. If the data sending unit 103a has sent error mixed data to the TV 200, the procedure of this flowchart ends. In this case as well, the process of step S105 to step S107 may be performed until the mode of the camera 100 has changed from the first mode to the second mode. Furthermore, also in the case where the mode of the camera 100 has changed from the first mode to the second mode, process may be performed similarly to the case where it has been determined in step S104 that the mode is the second mode.

If the display unit 204 of the TV 200 is displaying video data received from the camera 100, the display unit 204 displays the error mixed data.

Accordingly, if the display unit 204 of the TV 200 is displaying video data that has been sent from the camera 100, the user who is viewing content on the TV 200 can be notified that an error has occurred in the camera 100.

Also, in order to notify the user that an error has occurred in the camera 100, information for identifying the camera 100 may be included in the first warning data. Examples of information for identifying the camera 100 include information indicating the product name of the camera 100, information indicating the product category of the camera 100, and the manufacturer of the camera 100.

Also, if the display unit 204 of the TV 200 is not displaying video data received from the camera 100, the display unit 204 of the TV 200 does not display the error mixed data that has been sent from the camera 100 to the TV 200. In this case, in order for the error mixed data sent from the camera 100 to the TV 200 to be displayed by the display unit 204 of the TV 200, the camera 100 may send, to the TV 200, a CEC command for causing the TV 200 to display video data received from the camera 100. The camera 100 may send, to the TV 200, the CEC command for causing the TV 200 to display video data received from the camera 100, and thereafter send the error mixed data to the TV 200.

Examples of the CEC command used by the camera 100 to cause the TV 200 to display video data received from the camera 100 include the <Active Source> command and the <Image View On> command defined in CEC standards. Also, the CEC command used by the camera 100 to cause the TV 200 to display video data received from the camera 100 may include the <Text View On> command instead of the <Image View On> command. Furthermore, the CEC command used by the camera 100 to cause the TV 200 to display video data received from the camera 100 may be a vendor command.

In step S108, the CPU 101 performs second error warning process in accordance with the second mode. If the CPU 101 has executed the second error warning process, the procedure of this flowchart ends. In this case, the process of step S108 may be performed until the mode of the camera 100 has changed from the second mode to the first mode. Furthermore, if the mode of the camera 100 has changed from the second mode to the first mode, process may be performed similarly to the case where it has been determined in step S104 that the mode is the first mode.

Note that although mixed data obtained by mixing video data and shooting information recorded in the memory 102 is sent to the TV 200 in step S105, in this case the shooting character data to be mixed with video data may be an icon. Also, the first warning data may be an icon corresponding to the type of error or video data corresponding to the type of error.

Note that also in the case where the CPU 101 has received multiple error signals from the abnormality detection unit 110, the CPU 101 performs process similar to the process of step S107. In this case, error warning information pieces respectively corresponding to the received error signals are supplied from the CPU 101 to the image processing unit 105, and the image processing unit 105 converts each of the error warning information pieces into a first warning data piece. The image processing unit 105 mixes the converted first warning data pieces with video data supplied from the image capture unit 104, and the communication unit 103 sends the mixed data to the TV 200.

Second Error Warning Process

Next is a description of the second error warning process performed by the camera 100 of First embodiment with reference to FIG. 5.

FIG. 5 is a flowchart illustrating an example of the second error warning process performed by the camera 100 of First embodiment.

Note that the second error warning process is controlled by the CPU 101 executing a computer program stored in the memory 102. Also, the computer program for causing the camera 100 to execute the second error warning process shown in FIG. 5 may be realized using, for example, a network or an OS running on a computer (a CPU, an MPU, or the like).

In step S201, the CPU 101 determines whether an error signal has been received from the abnormality detection unit 110. If the CPU 101 has determined that an error signal was received from the abnormality detection unit 110 (YES in step S201), the procedure of this flowchart advances from step S201 to step S202. If the CPU 101 has determined that an error signal has not been received from the abnormality detection unit 110 (NO in step S201), the procedure of this flowchart ends.

In step S202, the CPU 101 determines whether the TV 200 has a recording function. In step S202, the CPU 101 controls the command processing unit 103b so as to send, to the TV 200, a vendor command for checking whether the TV 200 has a recording function (hereinafter, referred to as the "first recording check command"). A vendor command is a CEC command that the camera 100 and TV 200 can respond to if the manufacturer of the camera 100 is corresponding to the manufacturer of the TV 200.

If the manufacturer of the camera 100 is corresponding to the manufacturer of the TV 200, and furthermore the first recording check command has been received from the camera 100, the TV 200 sends an Ack signal to the camera 100 if the TV 200 has a recording function. If the manufacturer of the camera 100 is not corresponding to the manufacturer of the TV 200, the TV 200 does not send an Ack signal to the camera 100 in reply to the first recording check command from the camera 100, even if the TV 200 has a recording function. Also, if the TV 200 does not have a recording function, the TV 200 does not send an Ack signal to the camera 100 in reply to the first recording check command from the camera 100.

The CPU 101 determines whether the TV 200 has a recording function based on whether an Ack signal has been received from the TV 200. After the first recording check command has been sent to the TV 200, if the command processing unit 103b has received an Ack signal from the TV 200, the CPU 101 determines that the TV 200 has a recording function. After the first recording check command has been sent to the TV 200, if the command processing unit 103b has not received an Ack signal from the TV 200, the CPU 101 determines that the TV 200 does not have a recording function. Also, after the first recording check command has been sent to the TV 200, if the command processing unit 103b has received a Nack signal from the TV 200, the CPU 101 likewise determines that the TV 200 does not have a recording function.

If the CPU 101 has determined that the TV 200 has a recording function (YES in step S202), the procedure of this flowchart advances from step S202 to step S204. If the CPU 101 has determined that the TV 200 does not have a recording function (NO in step S202), the procedure of this flowchart advances from step S202 to step S203. Note that CPU 101 may determine whether the TV 200 has a recording function based on a product ID included in the EDID of the TV 200 that is recorded in the memory 102. Also, the CPU 101 may determine whether the TV 200 has a recording function based on a CEC command defined in CEC standards.

In step S203, similarly to step S107, the CPU 101 controls the image processing unit 105 so as to generate error mixed data by mixing error character data and video data, and controls the data sending unit 103a so as to send the error mixed data to the TV 200. If the data sending unit 103a has sent error mixed data to the TV 200, the procedure of this flowchart ends.

In step S204, the CPU 101 determines whether the TV 200 is performing recording.

In step S204, the CPU 101 controls the command processing unit 103b so as to generate a vendor command for checking whether the TV 200 is performing recording (hereinafter, referred to as the "second recording check command"), and send the generated second recording check command to the TV 200. If the manufacturer of the camera 100 is corresponding to the manufacturer of the TV 200, and furthermore the second recording check command has been received from the camera 100, the TV 200 sends an Ack signal to the camera 100 if the TV 200 is performing recording. If the manufacturer of the camera 100 is not corresponding to the manufacturer of the TV 200, the TV 200 does not send an Ack signal to the camera 100 in reply to the second recording check command from the camera 100, even if the TV 200 is performing recording. Also, if the TV 200 is not performing recording, the TV 200 does not send an Ack signal to the camera 100 in reply to the second recording check command from the camera 100.

The CPU 101 determines whether the TV 200 is performing recording based on whether an Ack signal has been received from the TV 200. After the second recording check command has been sent to the TV 200, if the command processing unit 103b has received an Ack signal from the TV 200, the CPU 101 determines that the TV 200 is performing recording. After the second recording check command has been sent to the TV 200, if the command processing unit 103b has not received an Ack signal from the TV 200, the CPU 101 determines that the TV 200 is not performing recording. Also, after the second recording check command has been sent to the TV 200, if the command processing unit 103b has received a Nack signal from the TV 200, the CPU 101 likewise determines that the TV 200 is not performing recording.

If the CPU 101 has determined that the TV 200 is performing recording (YES in step S204), the procedure of this flowchart advances from step S204 to step S205. If the CPU 101 has determined that the TV 200 is not performing recording (NO in step S204), the procedure of this flowchart moves from step S204 to step S203.

In step S205, the CPU 101 determines whether an error signal determined to have been received from the abnormality detection unit 110 is a high-priority error among various errors that occurs in the camera 100. The CPU 101 determines whether the error signal determined to have been received from the abnormality detection unit 110 is a high-priority error based on whether the received error signal corresponds to one of "Error 1", "Error 2", and "Error 3" at least. If the received error signal corresponds to one of "Error 1", "Error 2", and "Error 3" at least, the CPU 101 determines that the received error signal is a high-priority error. If the CPU 101 has determined that the received error signal is a high-priority error (YES in step S205), the procedure of this flowchart moves from step S205 to step S203.

If the received error signal does not correspond to one of "Error 1", "Error 2", and "Error 3", the CPU 101 determines that the received error signal is a low-priority error. Note that if, for example, the received error signal corresponds to "Error 4", the CPU 101 determines that the received error signal is a low-priority error. If the CPU 101 has determined that the received error signal is a low-priority error (NO in step S205), the procedure of this flowchart advances from step S205 to step S206.

In step S206, the CPU 101 controls the communication unit 103 so as to send a CEC command including error warning information to the TV 200.

The CPU 101 determines which error type is indicated by the received error signal, and selects, from the memory 102, an error warning that indicates the error corresponding to the error type. The CPU 101 converts the error warning information into character data represented by ASCII code, and generates a CEC command including the second warning data obtained by converting the character data into ASCII code. Note that the second warning data is information indicating error warning information. It should also be noted that the CEC command including the second warning data obtained by converting the character data into ASCII code is hereinafter referred to as an "error warning command". The second warning data is an "OSD String" in HDMI standards. Note that the error warning command is, for example, the <Set OSD String> command.

Furthermore, the CPU 101 supplies the error warning command to the communication unit 103, and controls the command processing unit 103b so as to send the error warning command to the TV 200 via the CEC line 305. If the command processing unit 103b has sent the error warning command to the TV 200, the procedure of this flowchart ends.

Note that in this case, the video data sent to the TV 200 via the TMDS line 304 is video data that does not include the first warning data. If the command processing unit 103b sends the error warning command to the TV 200 while the data sending unit 103a is sending video data to the TV 200 via the TMDS line 304, the sending of the video data from the data sending unit 103a to the TV 200 is not interrupted.

If the TV 200 has received the error warning command from the camera 100, the display unit 204 displays character data indicated by the second warning data so as to be mixed with the video data displayed by the display unit 204. Note that in this case, it is possible for the display unit 204 of the TV 200 to not be displaying video data received from the camera 100.

Accordingly, even if the display unit 204 of the TV 200 is not displaying video data that has been sent from the camera 100, the user who is viewing content on the TV 200 can be notified that an error has occurred in the camera 100.

Also, in order to notify the user that an error has occurred in the camera 100, information for identifying the camera 100 may be included in the second warning data.

Note that a configuration is possible in which, in the case where the CPU 101 has received multiple error signals from the abnormality detection unit 110, in the sending of error warning commands to the TV 200, the CPU 101 may generate an error warning command for each error signal, and send the error warning commands to the TV 200 in sequential order.

In this way, with the camera 100 of First embodiment, if an error has occurred in the camera 100 in the case where video data and information regarding the video data are mixed before being sent to the TV 200, the first warning data can be sent to the TV 200 by being mixed with the video data. This enables using video data that has been received from the camera 100 and is displayed by the TV 200 to allow the user to recognize that an error has occurred in the camera 100.

Also, with the camera 100, if an error has occurred in the camera 100 in the case where video data and information regarding the video data are sent to the TV 200 without being mixed, the first warning data can be sent to the TV 200 by being mixed with the video data in accordance with the error and the state of the TV 200. Accordingly, if the TV 200 does not have a recording function, it is possible to use video data that has been received from the camera 100 and is displayed by the TV 200 to allow the user to recognize that an error has occurred in the camera 100.

Furthermore, if the TV 200 is not performing recording, it is possible to use video data that has been received from the camera 100 and is displayed by the TV 200 to allow the user to recognize that an error has occurred in the camera 100.

Moreover, if the TV 200 is performing recording, and furthermore the error is high-priority, it is possible to use video data that has been received from the camera 100 and is displayed by the TV 200 to allow the user to recognize that an error has occurred in the camera 100.

Also, if the TV 200 is performing recording, and furthermore the error is low-priority, it is possible to us an error warning command that has been received from the camera 100 and is displayed by the TV 200 to allow the user to recognize that an error has occurred in the camera 100. In this case, the second warning data included in the error warning command and the video data received from the camera 100 are mixed before being displayed by the TV 200, and therefore the video data recorded by the TV 200 does not include the first warning data. Accordingly, if the TV 200 is performing recording, and furthermore the error is low-priority, it is possible to allow the user to recognize that an error has occurred in the camera 100, and also prevent video data not intended by the user from being recorded by the TV 200.

Note that besides the case where a temperature of the image sensing element is high, the case where a remaining capacity of the battery is low, and the like, the error described in First embodiment may also be the case where the abnormality detection unit 110 has detected image flickering.

Also, the error warning command is not limited to being the <Set OSD String> command, and may be a vendor command including the second warning data.

Note that the first error warning process and the second error warning process of First embodiment may be performed if the operating mode of the camera 100 is the reproduction mode. If the operating mode of the camera 100 is the reproduction mode, in step S105 the CPU 101 controls the recording unit 106 so as to read out video data recorded on the recording medium 106a, and sends the video data read out from the recording medium 106a to the TV 200. Also, in this case, in step S107 the CPU 101 controls the image processing unit 105 so as to generate error mixed data in which an error warning and the video data read out from the recording medium 106a are mixed. Here, the error mixed data in which the error warning and the video data read out from the recording medium 106a are mixed is sent to the TV 200 by the data sending unit 103a. The second error warning process performed in the case where the operating mode of the camera 100 is the reproduction mode is similar to that performed in the case where the operating mode of the camera 100 is the shooting mode.

Second Embodiment

Next is a description of Second embodiment with reference to FIGS. 1 to 4 and FIG. 6. Note that in Second embodiment, descriptions of portions similar to those in First embodiment will not be given, and the description will focus on differences from First embodiment.

The memory 102 of the camera 100 according to Second embodiment has an external apparatus management list stored therein. Note that the external apparatus management list is a list for collectively managing external apparatuses, and pieces of external apparatus identification information indicating registered external apparatuses are recorded in the external apparatus management list. It should also be noted that information such as the product name of an external apparatus, the manufacturer of an external apparatus, and the manufacturing year of an external apparatus are stored in advance as external apparatus identification information in the external apparatus management list.

Second Error Warning Process

The following describes the second error warning process performed by the camera 100 of Second embodiment with reference to FIG. 6. FIG. 6 is a flowchart illustrating an example of the second error warning process performed by the camera 100 of Second embodiment. In First embodiment, the second error warning process is executed in step S108 of the first error warning process shown in FIG. 4, but in Second embodiment, the second error warning process shown in FIG. 6 is executed in step S108 of the first error warning process shown in FIG. 4. The first error warning process in Second embodiment is similar to the first error warning process in First embodiment. Note that process steps that are the same as those in First embodiment have been given the same step numbers.

It should also be noted that the second error warning process is controlled by the CPU 101 executing a computer program stored in the memory 102. Also, the computer program for causing the camera 100 to execute the error warning process shown in FIG. 6 may be realized using, for example, a network or an OS running on a computer.

The process performed in steps S201, S203, S205 and S206 in the flowchart shown in FIG. 6 is the same as the process performed in steps S201, S203, S205 and S206 in the flowchart shown in FIG. 5. Accordingly, a description of steps S201, S203, S205 and S206 will not be given in Second embodiment.

In step S201, if the CPU 101 has determined that an error signal was received from the abnormality detection unit 110 (YES in step S201), the procedure of this flowchart advances from step S201 to step S301.

In step S301, the CPU 101 determines, based on the results of analyzing the EDID of the TV 200 recorded in the memory 102 in step S103, whether the TV 200 is an external apparatus registered in the external apparatus management list recorded in the memory 102.

For example, if the product name of the TV 200 matches the product name of an external apparatus stored in the external apparatus management list, the CPU 101 determines that the TV 200 is an external apparatus registered in the external apparatus management list recorded in the memory 102. If the product name of the TV 200 does not match the product name of any external apparatus stored in the external apparatus management list, the CPU 101 determines that the TV 200 is not registered in the external apparatus management list recorded in the memory 102.

If the CPU 101 has determined that the TV 200 is registered in the external apparatus management list (YES in step S301), the procedure of this flowchart advances from step S301 to step S203. If the CPU 101 has determined that the TV 200 is not registered in the external apparatus management list (NO in step S301), the procedure of this flowchart advances from step S301 to step S205.

Also, in step S301, the CPU 101 may determine whether the TV 200 is an external apparatus registered in the external apparatus management list by comparing the manufacturer name of the TV 200 and the manufacturer names of external apparatuses registered in the external apparatus management list. Alternatively, in step S301, the CPU 101 may determine whether the TV 200 is an external apparatus registered in the external apparatus management list by comparing the manufacturing date of the TV 200 and the manufacturing dates of external apparatuses registered in the external apparatus management list.

With the camera 100 of Second embodiment, if an error has occurred in the camera 100 in the case where video data and information regarding the video data are sent to the TV 200 without being mixed, the first warning data can be sent to the TV 200 by being mixed with the video data if the TV 200 is registered. Accordingly, if the TV 200 is an apparatus registered in the camera 100, it is possible to use video data that has been received from the camera 100 and is displayed by the TV 200 to allow the user to recognize that an error has occurred in the camera 100.

Also, if the TV 200 is an apparatus that is not registered in the camera 100, and furthermore the error is high-priority, the first warning data can be sent by being mixed with video data. In this case, it is possible to use video data that has been received from the camera 100 and is displayed by the TV 200 to allow the user to recognize that an error has occurred in the camera 100.

Also, if the TV 200 is an apparatus that is not registered in the camera 100, and furthermore the error is low-priority, it is possible to use an error warning command that has been received from the camera 100 and is displayed by the TV 200 to allow the user to recognize that an error has occurred in the camera 100. In this case, it is possible to allow the user to recognize that an error has occurred in the camera 100, and also prevent video data not intended by the user from being recorded by the TV 200.

Also, with the camera 100 of Second embodiment, process other than the process performed in step S301 in FIG. 6 is similar to that in First embodiment, and thus the same advantages as those of First embodiment can be obtained.

Note that the external apparatus identification information in the external apparatus management list recorded in the memory 102 may be acquired from the EDID of an external apparatus that the camera 100 has received from the external apparatus. Also, the camera 100 may acquire the external apparatus identification information from an external apparatus using a vendor command or a CEC command. Furthermore, a configuration is possible in which the external apparatus identification information in the external apparatus management list recorded in the memory 102 can be set by the user.

Note that similarly to First embodiment, the first error warning process and the second error warning process of Second embodiment may also be performed in the case where the operating mode of the camera 100 is the reproduction mode. The second error warning process performed in the case where the operating mode of the camera 100 is the reproduction mode is similar to that performed in the case where the operating mode of the camera 100 is the shooting mode.

Other Embodiments

The imaging apparatus according to the present invention is not intended to be limited to the camera 100 described in Embodiments 1 and 2. The imaging apparatus according to the present invention can also be realized by, for example, a system configured by multiple apparatuses.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-189983, filed Aug. 26, 2010, which is hereby incorporated by reference herein in its entirety.

What is claimed is:

1. An electronic apparatus comprising:
a sending unit that sends data to an external_apparatus; and
a control unit that executes, based on a state of the external apparatus, one of a first process and a second process, wherein the first process includes a process for sending predetermined data to the external apparatus, wherein the predetermined data is generated by mixing video data and first ancillary data, wherein the second process includes a process for sending second ancillary data to the external apparatus without mixing video data and the second ancillary data,
wherein the control unit executes the first process without executing the second process to cause the external apparatus to output ancillary data relating to the electronic apparatus if the external apparatus is not in a recording mode, and wherein the recording mode is used for recording video data received from the electronic apparatus.

2. The electronic apparatus according to claim 1, wherein the first ancillary data includes ancillary data relating to the electronic apparatus, and wherein the second ancillary data includes ancillary data relating to the electronic apparatus.

3. The electronic apparatus according to claim 1, wherein the control unit executes the second process without executing the first process if the external apparatus is in the recording mode.

4. The electronic apparatus according to claim 1, wherein the first ancillary data includes data relating to predetermined error, wherein the predetermined error includes at least one of an error indicating that a remaining capacity of a battery connected to the electronic apparatus is lower than a first predetermined value, an error indicating that a temperature of a recording medium connected to the electronic apparatus is greater than or equal to a second predetermined value, and an error indicating that a temperature of an image capture device used by the electronic apparatus is greater than or equal to a third predetermined value, and wherein the second ancillary data includes data relating to the predetermined error.

5. The electronic apparatus according to claim 1, wherein the predetermined data is sent to the external apparatus as video data.

6. An electronic apparatus comprising:
a sending unit that sends data to an external apparatus; and
a control unit that executes one of a first process and a second process, wherein the first process includes a process for sending predetermined data to the external apparatus, wherein the predetermined data is generated by mixing video data and first ancillary data, wherein the second process includes a process for sending second ancillary data to the external apparatus without mixing video data and the second ancillary data, and wherein the control unit executes the first process without executing the second process to cause the external apparatus to output ancillary data relating to the electronic apparatus if the external apparatus is registered in the electronic apparatus.

7. The electronic apparatus according to claim 6, wherein the first ancillary data includes ancillary data relating to the electronic apparatus, and wherein the second ancillary data includes ancillary data relating to the electronic apparatus.

8. The electronic apparatus according to claim 6, wherein the control unit executes the second process without executing the first process if the external apparatus is not registered in the electronic apparatus.

9. The electronic apparatus according to claim 6, wherein the first ancillary data includes data relating to predetermined error, wherein the predetermined error includes at least one of an error indicating that a remaining capacity of a battery connected to the electronic apparatus is lower than a first predetermined value, an error indicating that a temperature of a recording medium connected to the electronic apparatus is greater than or equal to a second predetermined value, and an error indicating that a temperature of an image capture device used by the electronic apparatus is greater than or equal to a third predetermined value, and wherein the second ancillary data includes data relating to the predetermined error.

10. The electronic apparatus according to claim 6, wherein the predetermined data is sent to the external apparatus as video data.

11. A method comprising:
sending data to an external apparatus;
executing, based on a state of the external apparatus, one of a first process and a second process, wherein the first process includes a process for sending predetermined data to the external apparatus, wherein the predetermined data is generated by mixing video data and first ancillary data, and wherein the second process includes a process for sending second ancillary data to the external apparatus without mixing video data and the second ancillary data; and
executing the first process without executing the second process to cause the external apparatus to output ancillary data relating to an electronic apparatus if the external apparatus is not in a recording mode, and wherein the recording mode is used for recording video data received from the electronic apparatus.

12. A method comprising:
sending data to an external apparatus;
executing one of a first process and a second process, wherein the first process includes a process for sending predetermined data to the external apparatus, wherein the predetermined data is generated by mixing video data and first ancillary data, and wherein the second process includes a process for sending second ancillary data to the external apparatus without mixing video data and the second ancillary data; and
executing the first process without executing the second process to cause the external apparatus to output ancillary data relating to an electronic apparatus if the external apparatus is registered in the electronic apparatus.

13. A non-transitory computer-readable recording medium storing a program executed by a computer, wherein the program causes the computer to perform a method, the method comprising:
sending data to an external apparatus;
executing, based on a state of the external apparatus, one of a first process and a second process, wherein the first process includes a process for sending predetermined data to the external apparatus, wherein the predetermined data is generated by mixing video data and first ancillary data, and wherein the second process includes a process for sending second ancillary data to the external apparatus without mixing video data and the second ancillary data; and executing the first process without executing the second process to cause the external apparatus to output ancillary data relating to an electronic apparatus if the external apparatus is not in a recording mode, and wherein the recording mode is used for recording video data received from the electronic apparatus.

14. A non-transitory computer-readable recording medium storing a program executed by a computer, wherein the program causes the computer to perform a method, the method comprising:

sending data to an external apparatus;

executing one of a first process and a second process, wherein the first process includes a process for sending predetermined data to the external apparatus, wherein the predetermined data is generated by mixing video data and first ancillary data, and wherein the second process includes a process for sending second ancillary data to the external apparatus without mixing video data and the second ancillary data; and executing the first process without executing the second process to cause the external apparatus to output ancillary data relating to an electronic apparatus if the external apparatus is registered in the electronic apparatus.

* * * * *